May 5, 1942.  A. P. McDONALD  2,282,073
VITREOUS CLAY UNDERGROUND CONDUIT
Filed Jan. 19, 1939  2 Sheets-Sheet 1
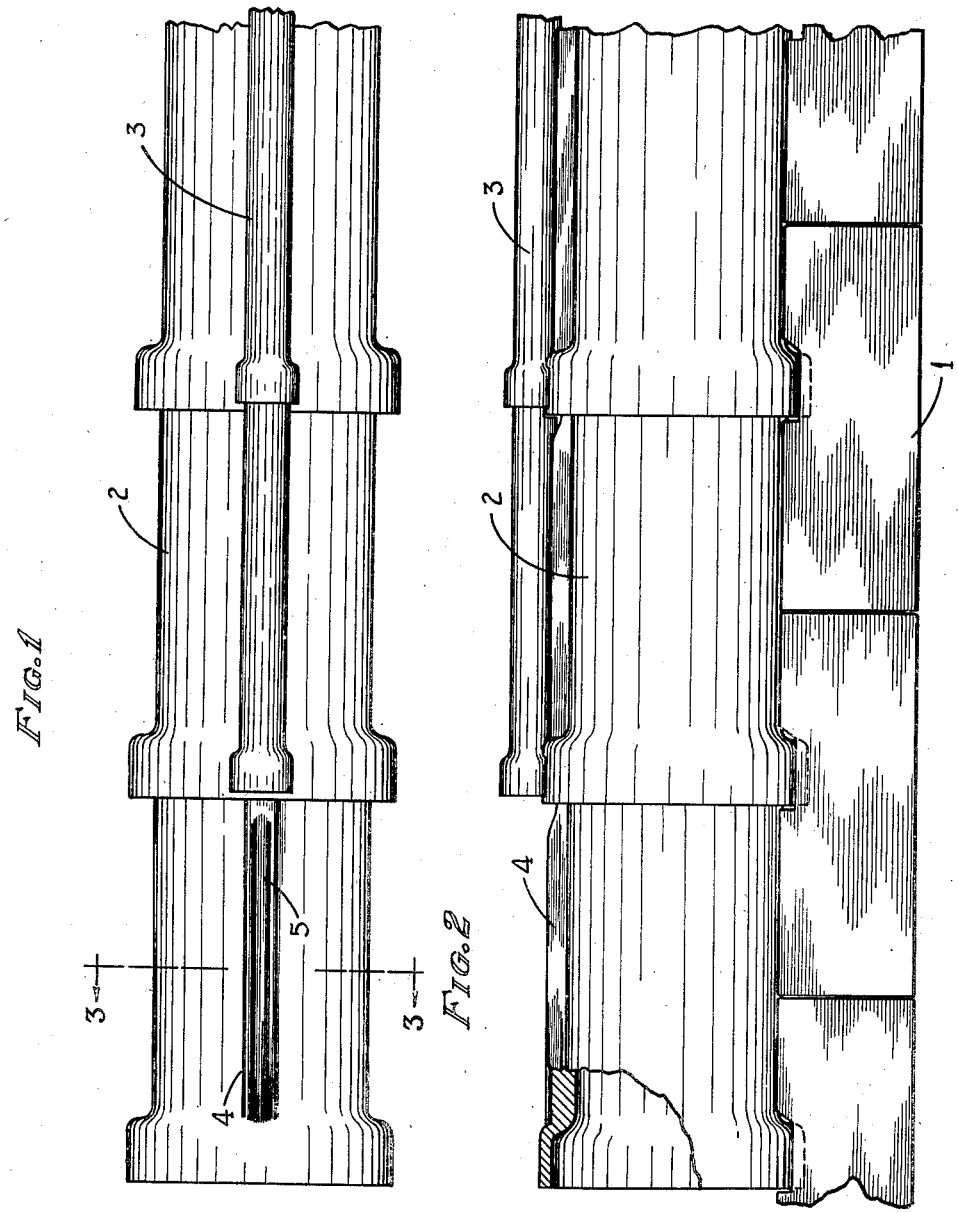
ALBERT P. McDONALD
INVENTOR
by Arthur H. Robert
ATTORNEY May 5, 1942. A. P. McDONALD 2,282,073
VITREOUS CLAY UNDERGROUND CONDUIT
Filed Jan. 19, 1939 2 Sheets-Sheet 2

ALBERT P. McDONALD
— INVENTOR
by Arthur J. Robert
— ATTORNEY

Patented May 5, 1942

2,282,073

UNITED STATES PATENT OFFICE 2,282,073

VITREOUS CLAY UNDERGROUND CONDUIT

Albert P. McDonald, Louisville, Ky.

Application January 19, 1939, Serial No. 251,722

5 Claims. (Cl. 138—48)

This invention relates to improvements in vitreous-clay conduits of the character largely used underground to encase the piping of steam-transmission, electrical wiring and other systems. Conduits of this character are usually shipped to the job in the form of short cylindrical sections, which, at the job, are split longitudinally into upper and lower halves. The lower halves are successively laid end to end on the upper surface of a sectional base drain resting upon the floor of the trench in which the conduit is to be buried. The upper halves are placed over and cemented or otherwise secured to the lower halves, after the pipes, pipe supports and insulating material have been installed, whereupon the trench is filled in.

Where both steam transmitting and electrical-wiring systems are to be installed, the problem of condensation within conduits encasing steam lines make highly undesirable the encasement of both systems in the same conduit, although the large conduit ordinarily used for a steam system usually contains ample space for the reception of the wiring system. Heretofore, the general practice has been to install the steam system in a large main conduit and the wiring system in a smaller auxiliary conduit and to arranged both conduits in side-by-side relation on separate base drains laid in the same trench.

The principal object of this invention is to provide a simpler, less expensive, and more effective arrangement for supporting main and auxiliary conduits within the same trench.

A further object is to interlock the two conduits together in a simple and effective manner.

The invention is illustrated in the accompanying drawings, wherein:

Figure 1 is a top plan view of several main and auxiliary conduit sections constructed and arranged in accordance with the present invention;

Figure 2 is a partly broken side elevation thereof;

Figure 4:
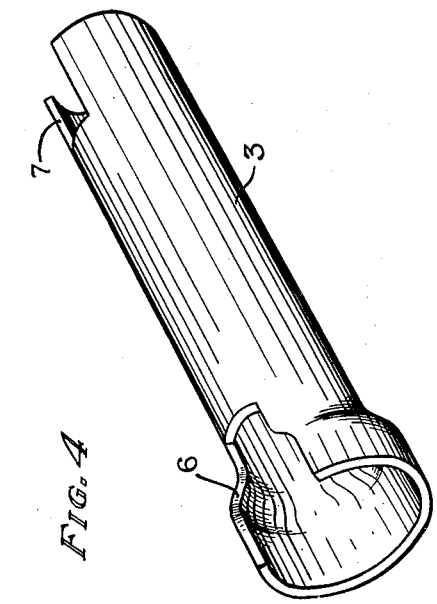
Figure 4 is a perspective view of one auxiliary conduit section.

The drawings conventionally illustrate a series of base-drain sections 1 successively laid in end-to-end relation, and a similar series of main conduit sections 2 supported on the base drain. The conduit sections 2 are of the conventional bell and spigot type in that each section is of straight cylindrical shape at one end and of flared shape at the opposite end. It will be understood, of course, that the base drain is laid upon the floor of a trench, dug to receive it, while the main conduit sections are installed on the base drain, in the usual manner, to encase steam-transmission systems and the like.

In accordance with the present invention, an auxiliary conduit is installed on the top of the main conduit instead of being installed, as heretofore, on a separate base drain. Accordingly, each main conduit section 2 is provided along its top with retaining means for receiving and holding the assembled auxiliary conduit sections 3. While this may be done in various ways, it is simply and conveniently accomplished by providing the top main conduit sections 1 with a longitudinally extending rib 4 having its upper surface concavely curved to form a conduit receiving saddle 5. While ribs 4 may be discontinuous, they are shown as extending continuously from the flare at the bell end to the bell receiving area of the spigot end, i. e., the area normally occupied by the telescoping bell of an adjacent section. The spigot end of the rib may be beveled as shown to facilitate assembly.

The auxiliary conduit sections 3 may be of any suitable type as shown in Figures 1-4. The customary installation procedure heretofore employed to install them on a base drain, may be used to install them on the saddle 5. If desired, the auxiliary conduit sections may be advantageously interlocked with the main conduit sections. To accomplish this simply and effectively: the bottom of the saddle 5 of each main section is made to extend on a level slightly below the outer surface level of that portion of the bell which it intersects; the bell end of each auxiliary conduit section is cut away or notched at the bottom, as indicated at 6, to accommodate or fit around the relatively elevated bell flare of the main section on which it may be placed; and the spigot end of each auxiliary section is also cut away or notched, as indicated at 7, to accommodate the bell flare of that main section which is placed next adjacent to the main section on which the auxiliary section in question is placed. With this arrangement, the main and auxiliary conduits become interlocked when the bell and spigot joints of each conduit are cemented or otherwise secured together in the normal way. Furthermore, when the trench is filled in, the weight of the earth around and above the auxiliary conduit tends to insure the firm retention of its sections upon the saddle and thus correspondingly tends to render them effective to maintain the alignment of the main conduit sections.

Figure 5:
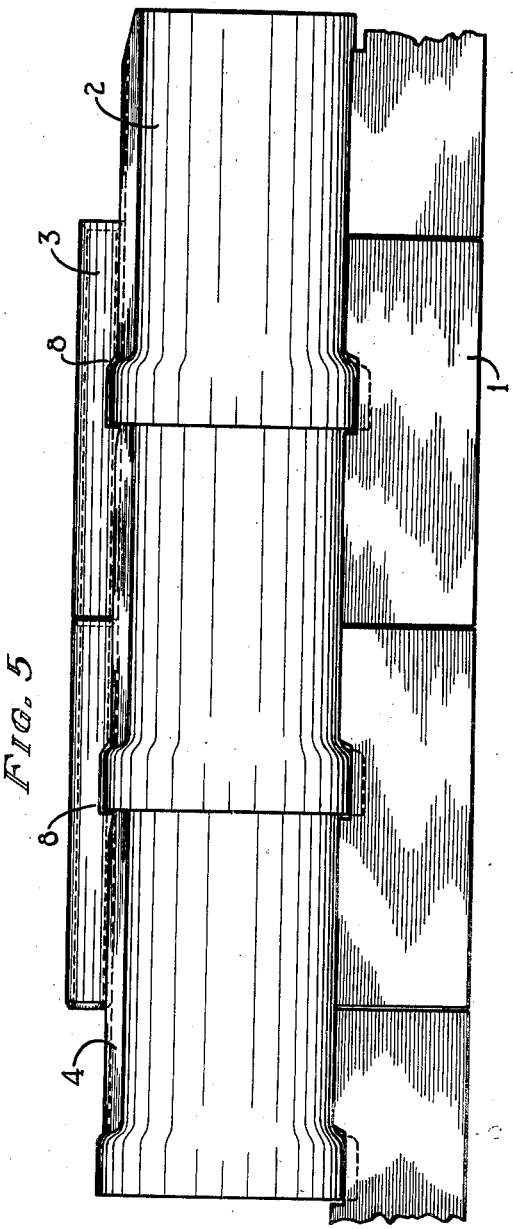
Figure 5 is a side elevation of an alternative arrangement.
Figure 3:
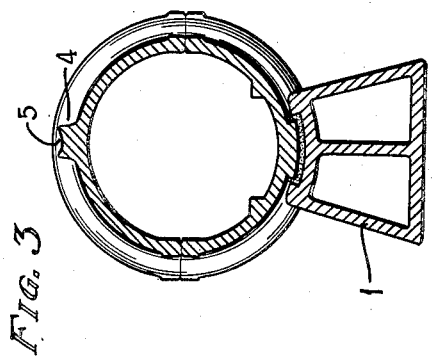
Figure 3 is a section taken along line 3—3 of Figure 1.

In the alternative structure, shown in Figure 5, main conduit sections 2, of the bell and spigot type, are formed with saddle-providing ribs 4 to support auxiliary conduit sections 3 of the straight cylindrical type. The bottom of the saddle, in this structure, likewise extends below the level of the intersecting bell surface. The auxiliary sections are telescopically connected to adjacent sections by means of a simple, cylindrically shaped, slip joint. The joints of auxiliary sections, however, are positioned between the joints of the main sections; hence the bottom of each auxiliary section is provided with a bell accommodating and interlocking notch 8.

Having described my invention, I claim:

1. In a conduit system: a base drain; a main conduit section supported on the base drain; and an auxiliary conduit section extending longitudinally along and supported on the upper surface of the main section.

2. In a conduit system: a base drain; a main conduit supported thereon; an auxiliary conduit extending longitudinally along and supported on the upper surface of the main conduit; and means for interlocking the conduits together.

3. In a conduit system: a base drain; a main conduit, supported thereon, composed of sections joined together by bell and spigot type joints; an auxiliary conduit composed of sections; and means for supporting the auxiliary conduit longitudinally upon the upper surface of the main conduit with the bottom of the auxiliary conduit sections extending on a level below the uppermost bell flare surfaces of the main conduit, the auxiliary conduit being cut away to accommodate said uppermost bell flare surfaces.

4. The system of claim 3, wherein the joints of the auxiliary conduit are positioned between joints of the main conduit.

5. In the conduit system of claim 1, saddle means integrally formed on the main conduit section to receive and hold the auxiliary conduit section thereon.

ALBERT P. McDONALD.